Patented July 29, 1952

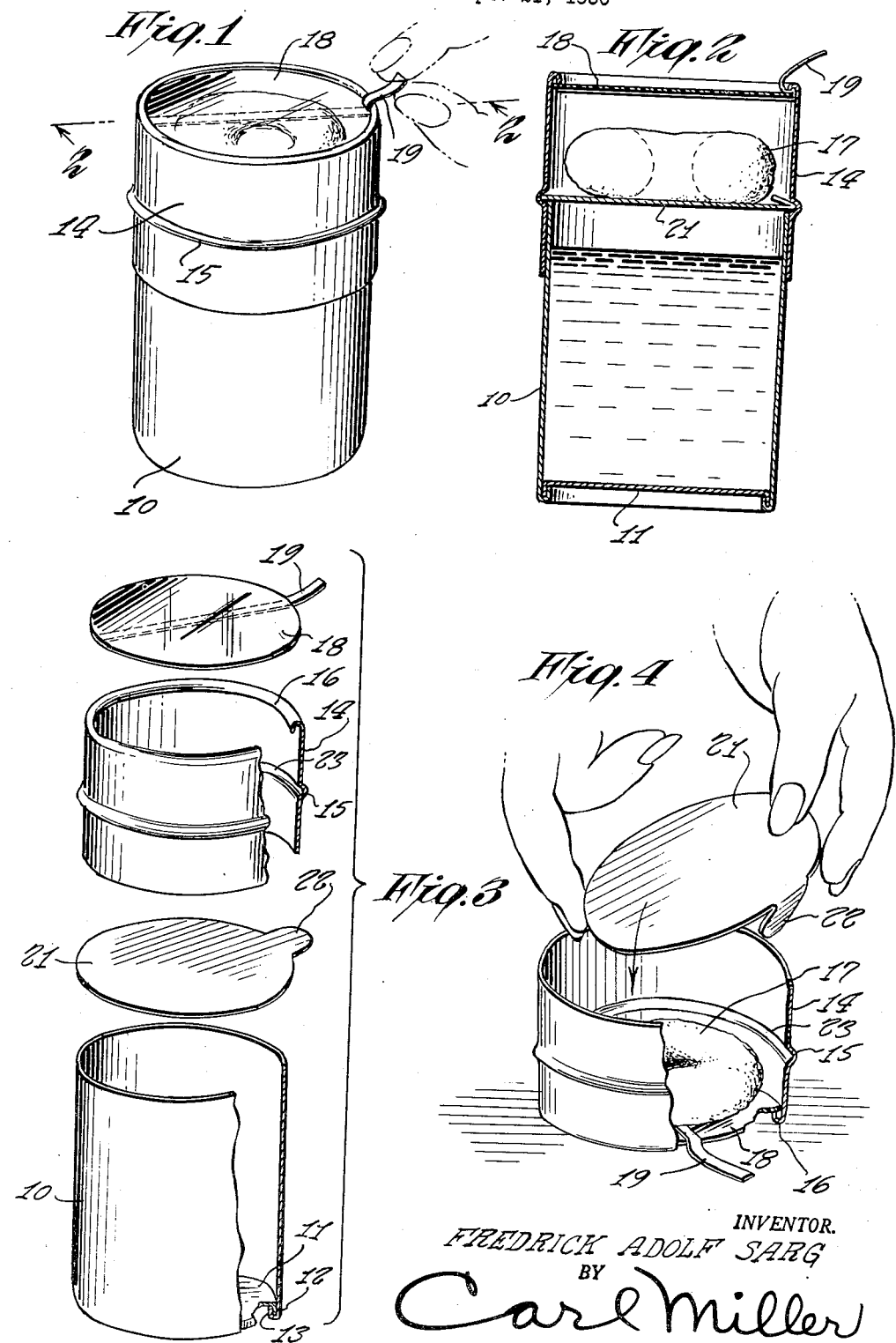

2,604,976

UNITED STATES PATENT OFFICE 2,604,976

COMBINED LIQUID AND FOOD LUNCH CONTAINER

Fredrick Adolf Sarg, Staten Island, N. Y.

Application September 21, 1950, Serial No. 185,923

3 Claims. (Cl. 206—4)

This invention relates to a paper combined liquid and food container.

It is an object of the present invention to provide a combined liquid and solid food container wherein the liquid container can be filled separately with the liquid and the food container can be filled separately with the food and wherein the parts of the two containers are adapted to interfit with one another and the food container can serve to close the liquid container, the bottom of the food container serving as the cover for the liquid container.

It is another object of the present invention to provide a partitioned container assembly made of paper board materials in which foods, edibles, such as doughnuts, cake or the like, may be packaged in the cover for the liquid container and wherein the cover has a transparent piece through which the foods are displayed and wherein the liquid container can be filled when the food has been selected and which has particular use in public places such as ball parks, race tracks and similar gatherings.

Other objects of the present invention are to provide a combined liquid and solid food container which is of simple construction, inexpensive to manufacture, prevents handling of the food by the vendor, keeps the food clean and free from contamination, reduces spoilage, has a minimum number of parts, is easy to assemble, prevents pilferage of money collected by the vendor as the vendor turns in the money for a certain number of containers, compact and efficient in operation.

For other objects and for a better understanding of the invention, reference may be had to the following detailed description taken in connection with the accompanying drawing, in which Fig. 1 is a perspective view of the combined liquid and food container embodying the features of the present invention.

Fig. 2 is a vertical sectional view of the container taken on line 2—2 of Fig. 1.

Fig. 3 is a collective view of the container with the parts separated from one another and shown in perspective.

Fig. 4 is a perspective view of the food container showing the manner in which it is assembled with the food and with portions broken away to show the construction of the same.

Referring now to the figures, 10 represents a liquid container having a bottom 11 with its outer periphery 12 folded under or down and with the bottom edge of the container folded inwardly and upwardly, as indicated at 13, over the folded down flange of the bottom 11.

The food container part comprises a cylindrical shell 14 having a peripheral bead 15 to reinforce the same. This shell is assembled with the food in the manner as shown in Fig. 4. The shell is inverted so that its folded in flange 16 serves as a rest for the container while foods, such as a doughnut 17, is placed on a transparent disc 18 that is held in place upon the folded in flange 16. A pull strip 19 is allowed to extend from the edge of the disc 18 and from under the flange 16 in order to remove the disc 18 when access is desired to the doughnut 17.

To support the doughnut when the cylindrical food container is turned up, a bottom plate 21 having a tab 22 is fitted in groove 23 provided on the inner face of the cylindrical member 14 by the bead 15. This bottom 21 is formed of stiff paper and preferably treated for sanitary purposes.

The food container, when inverted, serves as a cover for the liquid container 10, as shown in Figs. 1 and 2. The bottom 21 serves as a closure for the liquid container.

It will be seen that the food can be displayed separately from the liquid and the liquid can be poured and put in the container after the purchase of the food and the food container quickly attached to the liquid container.

It will be apparent that all of the above set forth objects have been accomplished by this arrangement. The food can be kept fresh and clean and easily visible and away from the hands of the vendor or the customer.

While various changes may be made in the detail construction, it shall be understood that such changes shall be within the spirit and scope of the present invention as defined by the appended claims.

Having thus set forth and disclosed the nature of my invention, what is claimed is:

1. A combined liquid and food container comprising a cylindric bottom container part adapted to receive and contain liquid and open at the top, a separate top food container part comprising an open ended cylindrical shell having an inner diameter equal to the outside diameter of the bottom container part, a transparent member connected to one end of the shell, an inner peripheral groove in said shell intermediate the ends thereof, a bottom cap fitted in the groove, the lower end of said shell fitting over the upper end of the bottom container and being thereby combined therewith.

2. A combined liquid and food container comprising a cylindric bottom container part adapted to receive and contain liquid and open at the top, a separate top food container part comprising an open ended cylindrical shell having an inner diameter equal to the outside diameter of the bottom container part, a transparent member connected to one end of the shell, an inner peripheral groove in said shell intermediate the ends thereof, a bottom cap fitted in the groove, the lower end of said shell fitting over the upper end of the bottom container and being thereby combined therewith, a pull strip disposed under the transparent disc in the upper end of the shell and extending outwardly therefrom serving to detach the transparent disc from the shell.

3. A combined liquid and food container comprising a cylindric bottom container part adapted to receive and contain liquid and open at the top, a separate top food container part comprising an open ended cylindrical shell having an inner diameter equal to the outside diameter of the bottom container part, a transparent member connected to one end of the shell, an inner peripheral groove in said shell intermediate the ends thereof, a bottom cap fitted in the groove, the lower end of said shell fitting over the upper end of the bottom container and being thereby combined therewith, a pull strip disposed under the transparent disc in the upper end of the shell and extending outwardly therefrom serving to detach the transparent disc from the shell, said bottom in the groove of the shell having a pull tab extending therefrom at its periphery and from the groove.

FREDRICK ADOLF SARG.

REFERENCES CITED

The following references are of record in the file of this patent:

UNITED STATES PATENTS

| Number | Name | Date |
| --- | --- | --- |
| 1,394,545 | French | Oct. 25, 1921 |
| 1,547,903 | Cole | July 28, 1925 |
| 1,693,841 | Gaylord | Dec. 4, 1928 |
| 1,933,468 | Abbot | Oct. 31, 1933 |
| 1,974,996 | Punte | Sept. 25, 1934 |
| 2,029,951 | Smith | Feb. 4, 1936 |
| 2,047,951 | Eberhart | July 21, 1936 |
| 2,287,610 | Guidry | June 23, 1942 |
| 2,433,926 | Sayre | Jan. 6, 1948 |